United States Patent [19]
Biet

[11] 3,715,684
[45] Feb. 6, 1973

[54] WINDOW FOR A LASER TUBE END PIECE

[75] Inventor: Jean-Pierre Biet, Saulx-les-Chartreux, France

[73] Assignee: Compagnie General D'Electricite, Paris, France

[22] Filed: April 10, 1972

[21] Appl. No.: 242,537

[30] Foreign Application Priority Data

April 9, 1971 France..................................7112779

[52] U.S. Cl..................................331/94.5, 350/319
[51] Int. Cl..............................................H01s 3/08
[58] Field of Search ....................331/94.5; 350/319

[56] References Cited

OTHER PUBLICATIONS

Large et al., A compact Pulsed Gas Laser for the Far Infrared; Applied Optics, Vol. 4, No. 5 (May 1965) pp. 625 and 626.

*Primary Examiner*—William L. Sikes
*Attorney*—Richard C. Sughrue et al.

[57] ABSTRACT

A window for a laser tube end piece, made of doped semi-conductor material comprising super-doping in the vicinity of the parts of the windows which are to come in contact with the end pieces of the laser tubes.

11 Claims, 1 Drawing Figure

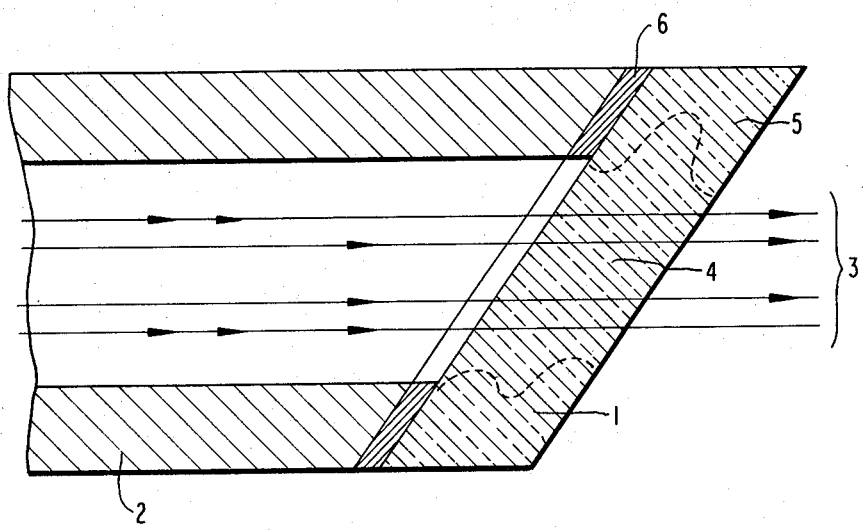

WINDOW FOR A LASER TUBE END PIECE

BACKGROUND OF THE INVENTION

1. Field of the Invention

The present invention concerns plates for laser tubes, and more particularly plates for laser generators which emit an infrared radiation, such as $CO_2$ laser generators.

2. Description of the Prior Art

A discharge tube of a laser generator is generally closed at least at one of its ends by a transparent optical blade such as, for example, a blade placed at Brewster incidence.

The service life of certain blades closing up laser tubes is limited by the effect of the thermal stresses which they have to undergo such as in the case of the $CO_2$ molecular lasers which send out energy capable of reaching several kilowatts. These blades eventually break as soon as there is a sufficient rise in temperature.

The rises in temperature in a Brewster incidence plate are caused by the fact that the material with which the blade is made is not completely transparent to the laser radiation, typically having a wavelength of 10.6 microns, and the light energy absorbed by the latter is transformed into thermal energy which is not negligible due to the high density of power of the beam.

In tubes manufactured heretofore the least variation in temperature has created a stress in the blade which caused the damaging of the latter be melting, dissociation, mechanical breakage or overheating, thus making it necessary to replace the blades and therefore also to make a new adjustment of the laser parameters.

To overcome these disadvantages a proposed solution has been to arrange on the end fittings forming the support of the laser tube output plate, radiators enabling the faster dissipation of calorific energy produced by the absorbing of the laser radiation by the material with which the output plate was made.

Deposit this action, it has been observed that the blades have too short a service life to enable laser generators which are to be fitted with such blades to be properly industrialized.

OBJECTS OF THE INVENTION

An object of the present invention is to avoid such operating incidents as described heretofore by improving the dissipation by conductivity of the heat produced in the blade by absorption of a part of the radiation of the laser generator, while simultaneously preserving a good light transmission of the latter.

Another object of the present invention is a plate for a laser tube end fitting consisting of a blade made of semi-conductive transparent material comprising a particular doping, characterized in that the blade comprises on at least a part of its periphery which is to be crossed by the beam coming from the laser tube, an excess doping of the same type so as to obtain, in said peripheral part, a semi-conductive material degenerated at its surface.

Other objects of the invention will be obvious to those skilled in the art as the description of the invention proceeds.

BRIEF DESCRIPTION OF THE DRAWING

The present invention will be better understood from the following description given with reference to the accompanying drawing, by way of illustration but which is not intended to be limiting, in which the FIGURE shows a sectional view of an embodiment of a plate placed on the end of a laser tube end fitting.

DETAILED DESCRIPTION OF THE INVENTION

The FIGURE shows an optical plate consisting of a blade 1 placed for example at Brewster incidence on the end of a laser discharge tube 2, partly illustrated. The laser beam 3 coming from the tube 2 crosses the blade 1 in its central part 4. When the laser generator comprising the tube 2 is a generator emitting an infrared beam, such as, for example, $CO_2$ laser generators emitting on a wavelength of 10.6 microns, the blade 1 is made of a transparent material which is generally a semi-conductive material such as, for example, one of the following bodies: germanium, gallium arsenide, silicon, etc. The blade 1 is made so that the central part has a doping of a determined type, that is, either of the N type (for example germanium doped with phosphorus or with antimony) or of the P type (germanium doped with boron or with aluminum, or with gallium or with indium).

To improve the thermal conductivity and the dissipation of heat by the absorbing of the beam 3 in the central part 4 of the blade 1, I have produced, in the peripheral part 5 of the blade 1 (and preferably in the part in contact with the end fitting of the discharge tube 2) an excess doping of the semi-conductive material of the same type as the doping, so as to obtain, in the peripheral part 5 of that plate 1, a semi-conductive body degenerated at its surface; for example, if the semi-conductive body is a doped body of the N type, the excess doping will be of the $N^{++}$ type, whereas if the semi-conductor is a body of the P type, the excess doping will be of the $P^{++}$ type.

It must be understood that the excess doping process on the peripheral part of the plate can be chosen from among known processes such as alloying, diffusion and epitaxy.

To improve the contact between the window 1 and the end of the laser discharge tube 2, which is generally metallic, the plate comprises on the peripheral part of the blade intended to be placed in contact with this tube 2, a thin intermediate metal layer 6 deposited, for example, by evaporation in a vacuum, cathodic spraying, serigraphy, etc. That metal layer 6 can be, for example, a layer of aluminum, of copper, of gold or any other material which is a good heat conductor. The contact between that metal layer 6 and the end fitting of the tube 2 is then effected, for example, by pressure or by soldering.

It is claimed:

1. A plate for a laser end fitting for a laser beam apparatus comprising a blade made of a semi-conductive material, comprising a doping of a certain type, characterized in that said blade comprises, on at least a peripheral part of the portion of said blade intended to be crossed by a beam coming from said laser beam apparatus, an excess doping of the same type so as to obtain, in said peripheral part, a semi-conductive material degenerated at its surface.

2. The plate according to claim 1, characterized in that it comprises a thin metal layer arranged on at least a part of the surface of the peripheral part of said blade containing said excess doping.

3. In a laser beam apparatus comprising a plate for a laser end fitting, said fitting comprising a blade made of a semi-conductive material, the improvement comprising said blade containing a doping on at least the peripheral part of the portion of said blade which is crossed by a beam from said laser beam apparatus whereby said semi-conductive material is degenerated at its surface.

4. The apparatus according to claim 3 wherein said semi-conductive material is selected from the group consisting of germanium, gallium arsenide and silicon.

5. The apparatus according to claim 3 wherein the central portion of said blade contains an N type doping.

6. The apparatus according to claim 5 wherein said doping is selected from the group consisting of phosphorus and antimony.

7. The apparatus according to claim 3 wherein the central portion of said blade contains a P type doping.

8. The apparatus according to claim 7 wherein said P type doping is selected from the group consisting of boron, aluminum, gallium and indium.

9. The apparatus according to claim 3 wherein said peripheral part of said blade contains a thin metallic layer selected from the group consisting of aluminum, copper and gold.

10. The apparatus according to claim 3 wherein said peripheral part of said blade contains a heat-conducting thin metallic layer.

11. A plate for a laser tube end fitting comprising a blade made of a semi-conductive transparent material containing a doping on said blade, the periphery of said blade containing an excessive doping whereby said semi-conductive material is degenerated at its surface containing the excessive doping, said periphery being exposed to a laser beam which is emitted from a laser tube.

* * * * *